United States Patent [19]

Scheibel, Jr. et al.

[11] Patent Number: 5,606,561
[45] Date of Patent: Feb. 25, 1997

[54] METHOD, DEVICE/MICROPROCESSOR, AND COMPUTER SOFTWARE FOR PROVIDING PACKET FRAGMENTATION FOR FAIR, EFFICIENT DOWNLINK TRANSMISSION WITH LOW PACKET DELAY

[75] Inventors: Robert C. Scheibel, Jr., Chicago; Jeffrey C. Smolinske, Hoffman Estates; Phieu M. Tran, Lincolnwood, all of Ill.

[73] Assignee: Motorola, Inc., Schaumburg, Ill.

[21] Appl. No.: 508,497

[22] Filed: Jul. 28, 1995

[51] Int. Cl.$^6$ ............................................. H04J 3/16
[52] U.S. Cl. .................................. 370/347; 370/349
[58] Field of Search ............................... 370/95.3, 95.1, 370/95.2, 94.1, 77, 79, 82, 83, 99, 60; 364/DIG. 1, DIG. 2

[56] References Cited

U.S. PATENT DOCUMENTS

| | | | |
|---|---|---|---|
| 5,231,635 | 7/1993 | Travers et al. | 370/95.3 |
| 5,398,247 | 3/1995 | Delprat et al. | 370/95.3 |
| 5,515,379 | 5/1996 | Crisler et al. | 370/95.3 |

*Primary Examiner*—Wellington Chin
*Assistant Examiner*—Huy D. Vu
*Attorney, Agent, or Firm*—Darleen J. Stockley

[57] ABSTRACT

The present invention provides a fair and efficient method (1000), device/microprocessor (500, 600) and computer software for utilizing the downlink channel in a TDMA packet-switched communication system supporting both single slot subscriber units and multiple slot subscriber units which both use the same air-interface protocol.

9 Claims, 6 Drawing Sheets

5,606,561

METHOD, DEVICE/MICROPROCESSOR, AND COMPUTER SOFTWARE FOR PROVIDING PACKET FRAGMENTATION FOR FAIR, EFFICIENT DOWNLINK TRANSMISSION WITH LOW PACKET DELAY

FIELD OF THE INVENTION

The present invention relates generally to a packet-switched communication system, and more particularly, to maintaining low delay in a packet-switched communication system.

BACKGROUND OF THE INVENTION

In time-division multiple access (TDMA) packet-switched communication systems, a base site transmits data to many different subscriber units using a common frequency channel by dividing the data into units called packets. Each packet may be divided to form segments. A segment contains the amount of data which may be transmitted during a discrete time slot of T seconds within a frame. A frame consists of n of these time slots, where n is a positive integer. Thus, a base site can communicate with multiple subscriber units on a basis of non-overlapping transmission bursts using a same carrier frequency.

In some of these TDMA packet-switched communication systems, subscriber units are characterized by the number of time slots per frame on which the subscriber unit hardware is capable of transmitting and receiving data. These characterizations may be divided into two basic categories: single slot subscriber units and multiple slot subscriber units. Single slot subscriber units are physically capable of transmitting and receiving data on one of the n time slots per frame. Multiple slot subscriber units are physically capable of transmitting and receiving data on as many as n time slots per frame. In systems supporting both types of subscriber units with one air interface protocol, there is a need for an efficient method of utilizing the downlink channel (from the base site to the subscriber unit) such that the higher throughput capability of the multiple slot subscriber units is exploited without degrading the performance of the single slot subscriber units.

DETAILED DESCRIPTION OF A PREFERRED EMBODIMENT

The present invention provides a fair and efficient method for utilizing the downlink channel in a TDMA packet-switched communication system supporting both single slot subscriber units and multiple slot subscriber units which both use the same air-interface protocol.

Figure 1:
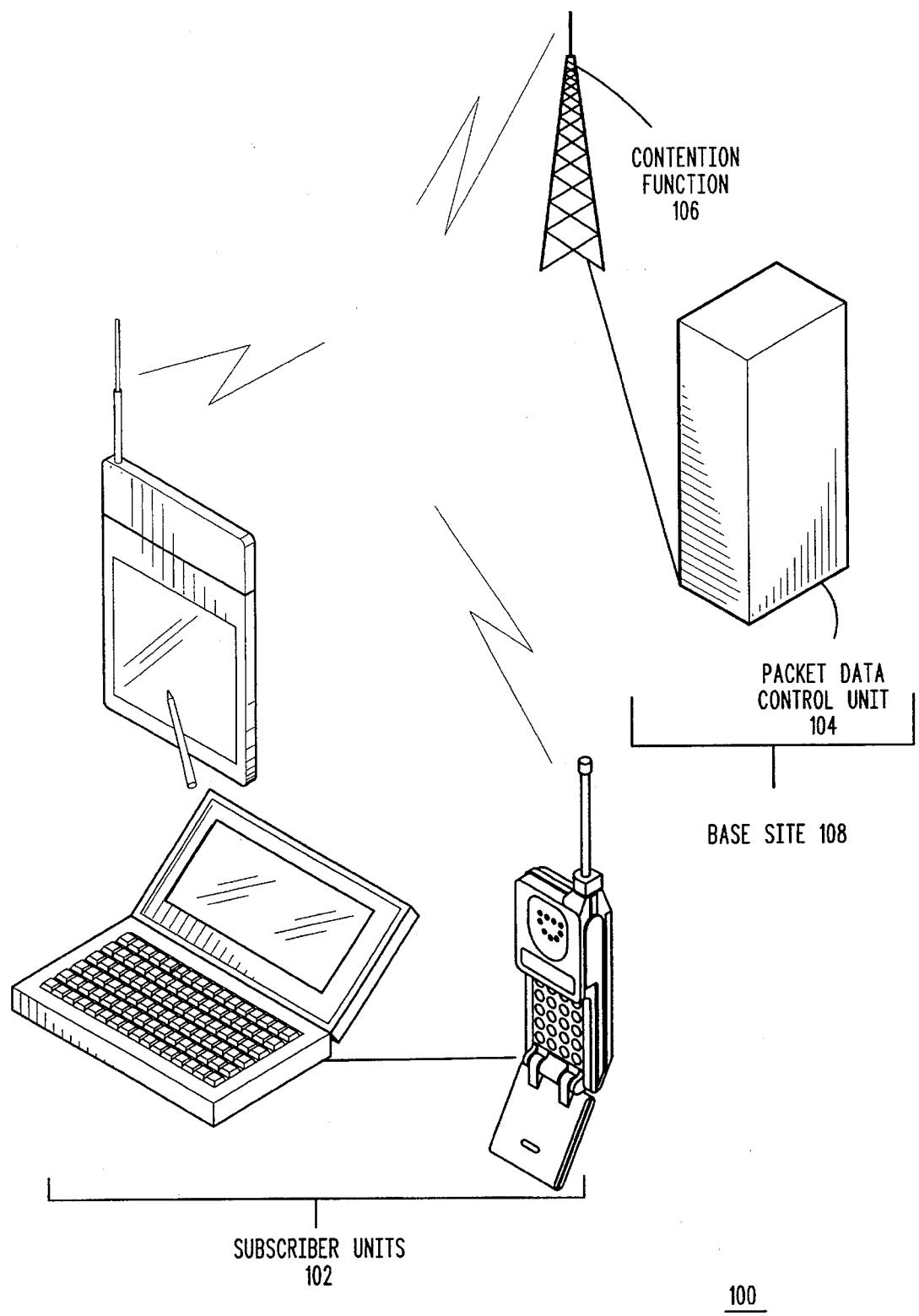
FIG. 1 shows a schematic representation of a communication system for transmitting packet data in accordance with the method of the present invention.

FIG. 1, numeral 100, shows a schematic representation of a communication system for transmitting packet data in accordance with the method of the present invention. A plurality of subscriber units (102) transmit signals to a packet data control unit (104) via the contention function (106) of the present invention. Below, the packet data control unit and the contention function are jointly referred to as the base site (108).

Figure 2:
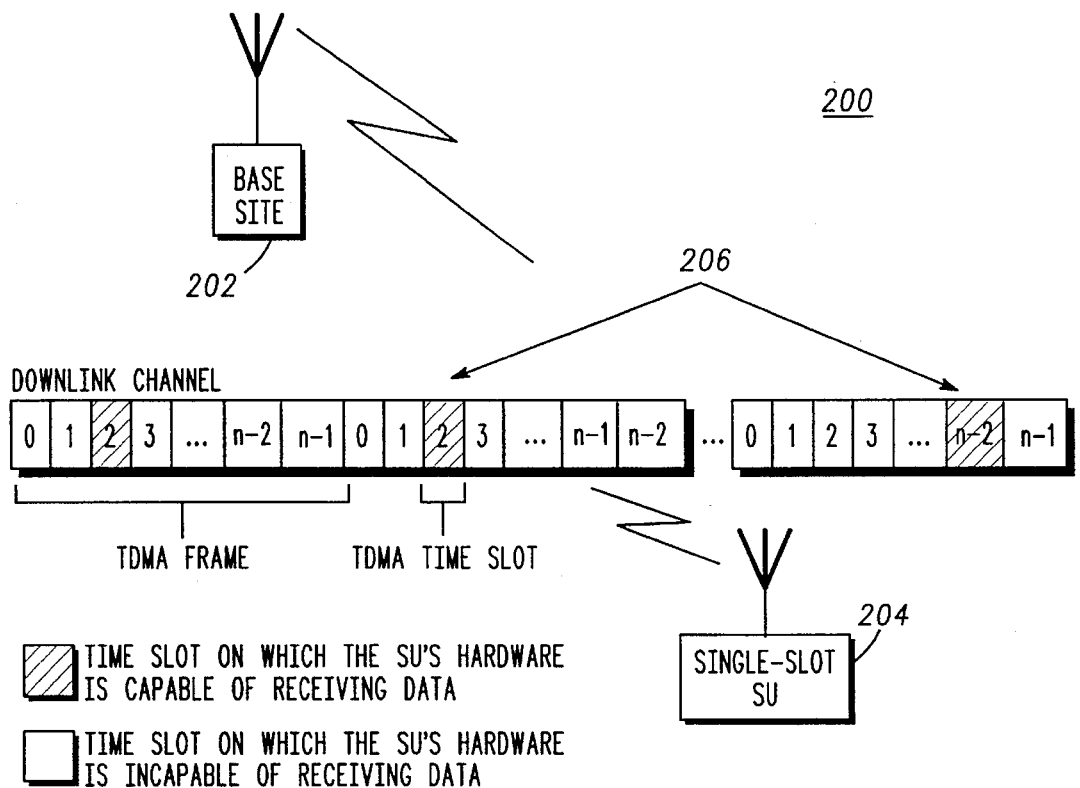
FIG. 2 is a diagrammatic representation of a downlink transmission on a single slot from a base site to a single slot subscriber unit.

FIG. 2, numeral 200, is a diagrammatic representation of a downlink transmission on a single slot from a base site (202) to a single slot subscriber unit (204). FIG. 2 illustrates that the single slot subscriber unit (204) is physically capable of receiving data on only one of the n time slots per frame. However, although the location of this time slot within a frame is static within a packet, it may vary between packets (206).

Figure 3:
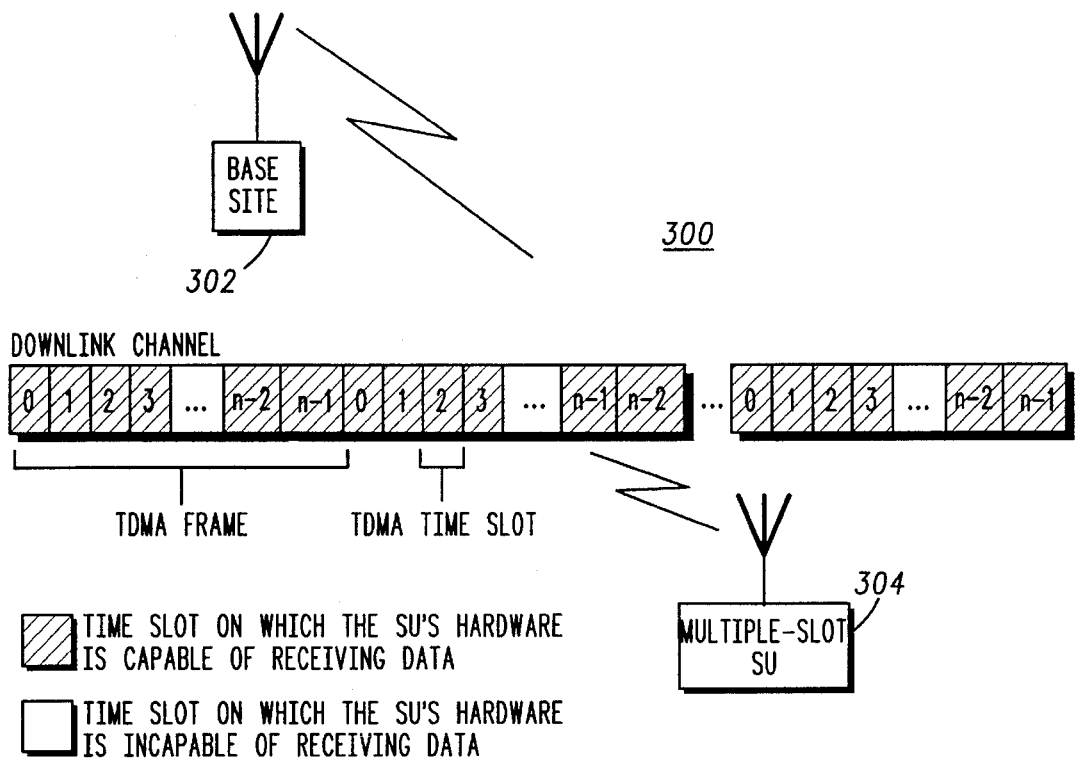
FIG. 3 is a diagrammatic representation of a downlink transmission on multiple slots from a base site to a multiple slot subscriber unit.

FIG. 3, numeral 300, is a diagrammatic representation of a downlink transmission on multiple slots from a base site (302) to a multiple slot subscriber unit (304). FIG. 3 illustrates that a multiple slot subscriber unit is physically capable of receiving data on all n time slots each frame.

Figure 4:
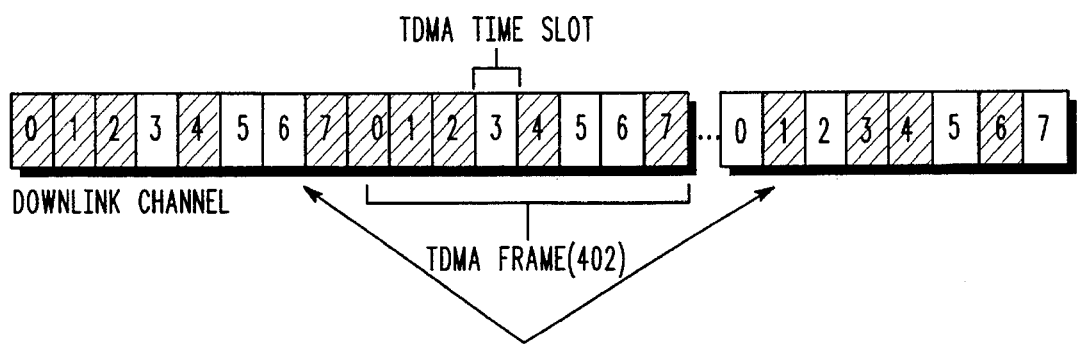
FIG. 4 is a diagrammatic representation of time slots for packet-switched data in a downlink channel wherein availability of time slots for packet-switched data is time varying.

In a preferred embodiment, the availability of time slots for use by packet-switched traffic is time-varying. For example, in a primarily circuit-switched system which utilizes unused time slots to transmit packet-switched data, both the number of available time slots per frame available for packet-switched traffic, and the location of these time slots within a frame vary as the circuit traffic load changes. FIG. 4, numeral 400, illustrates this property through an example with n=8 time slots per frame (402). In the first two frames, time slots 0, 1, 2, 4, and 7 are available (404) for packet-switched traffic; however, in the last frame, time slots 1, 3, 4, and 6 are available (404) for packet-switched traffic.

Figure 5:
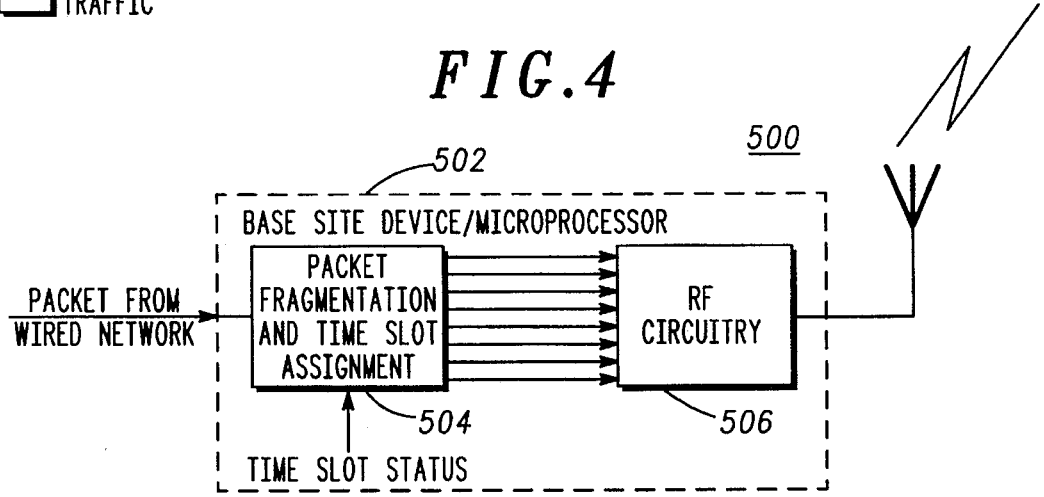
FIG. 5 is a block diagram of a preferred embodiment of a base site having a packet fragmentation and time slot assignment unit for fragmenting packets for downlink transmission having low delay in accordance with the present invention.

FIG. 5, numeral 500, is a block diagram of a preferred embodiment of a base site (502) having a packet fragmentation and time slot assignment unit (504) for fragmenting packets for downlink transmission having low delay in accordance with the present invention. A packet is received by the packet fragmentation and time slot assignment unit (504) from a wired network by the base site (502). The base site provides a time slot status, to the packet fragmentation and time slot assignment unit (504). Then, the packet fragmentation and time slot assignment unit (504) fragments the packet in accordance with a predetermined scheme and sends, via radio frequency (RF) circuitry (506), the fragments on one of: one of n available time slots to a subscriber unit having a single slot architecture and multiple available time slots to a subscriber unit having a multiple slot architecture.

Figure 6:
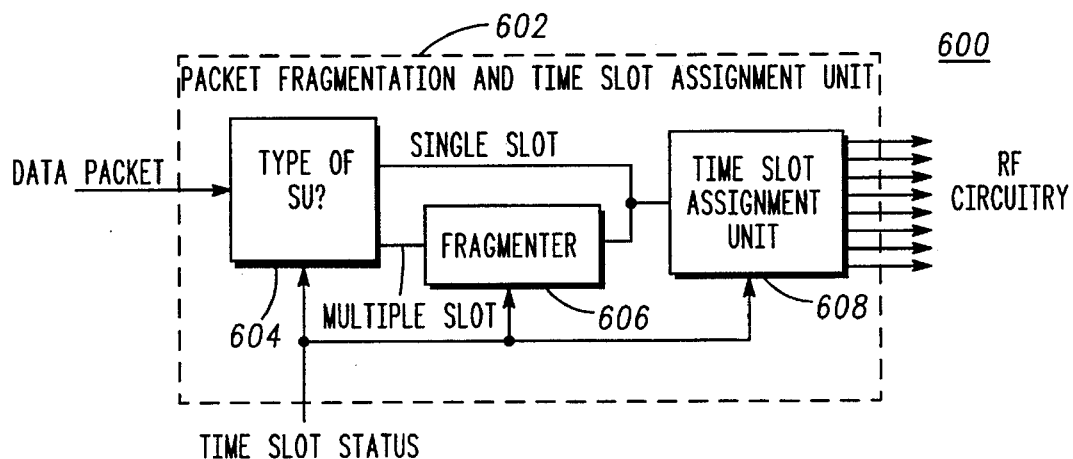
FIG. 6 is a block diagram of one embodiment of the packet fragmentation and time slot assignment unit of FIG. 5, shown with greater particularity, in accordance with the present invention.

FIG. 6, numeral 600, is a block diagram of one embodiment of the packet fragmentation and time slot assignment unit of FIG. 5, shown with greater particularity, in accordance with the present invention. The packet fragmentation and time slot assignment unit (602) typically includes a subscriber unit type determiner (604), a fragmenter (606), and a time slot assignment unit (608). The subscriber unit (SU) type determiner (604) determines a subscriber unit type of a received data packet. Where the subscriber unit type is single slot, the subscriber unit type determiner (604) sends the data packet to a time slot assignment unit (608). Where the subscriber unit type is multiple slot, the subscriber unit type determiner (604) sends the data packet to a fragmenter (606). The fragmenter (606) fragments the data packet intended for transmission to a multiple slot subscriber unit into a number of fragments based on a number of time slots available for packet-switched traffic and a hardware capability of the multiple time slot subscriber unit for transmitting/receiving a plurality of time slots. Each of these fragments may be further divided into segments which contain an amount of data which may be transmitted in one TDMA time slot. Each of these fragments is sent to the time slot assignment unit (608) and is then assigned to one of the available time slots. Finally, segments of each of these fragments are transmitted on the assigned time slots in each frame using the RF circuitry (506) of FIG. 5. The data link layer of the subscriber unit will reassemble the packet when all of its constituent fragments have been received, based on information contained in overhead control information.

From a data structural point of view, a multiple slot fragment is identical to a single slot packet; data is essentially transmitted to single slot subscriber units in one-fragment packets. However, from a functional point of view a multiple slot fragment differs from a single slot packet in that only one single slot fragment may be in transit to a same subscriber unit at a particular point in time, whereas the time slot assignment unit (608) schedules the m fragments, m a positive integer, comprising a multiple slot packet such that in the optimal case all of the fragments of the packet will be in transit on m different time slots at a particular point in time. Nevertheless, since the data elements are identical in terms of structure, the base site may allocate the downlink channel through the use of a relatively simple scheduling algorithm. In addition, by allowing the multiple slot fragments associated with a particular packet to be transmitted at the same time, the hardware capabilities of the multiple slot type of subscriber units can be fully exploited, thereby minimizing the transmission delay of the packets to the multiple slot type of subscriber units. These concepts are illustrated in FIGS. 7, 8, and 9.

Figure 7:
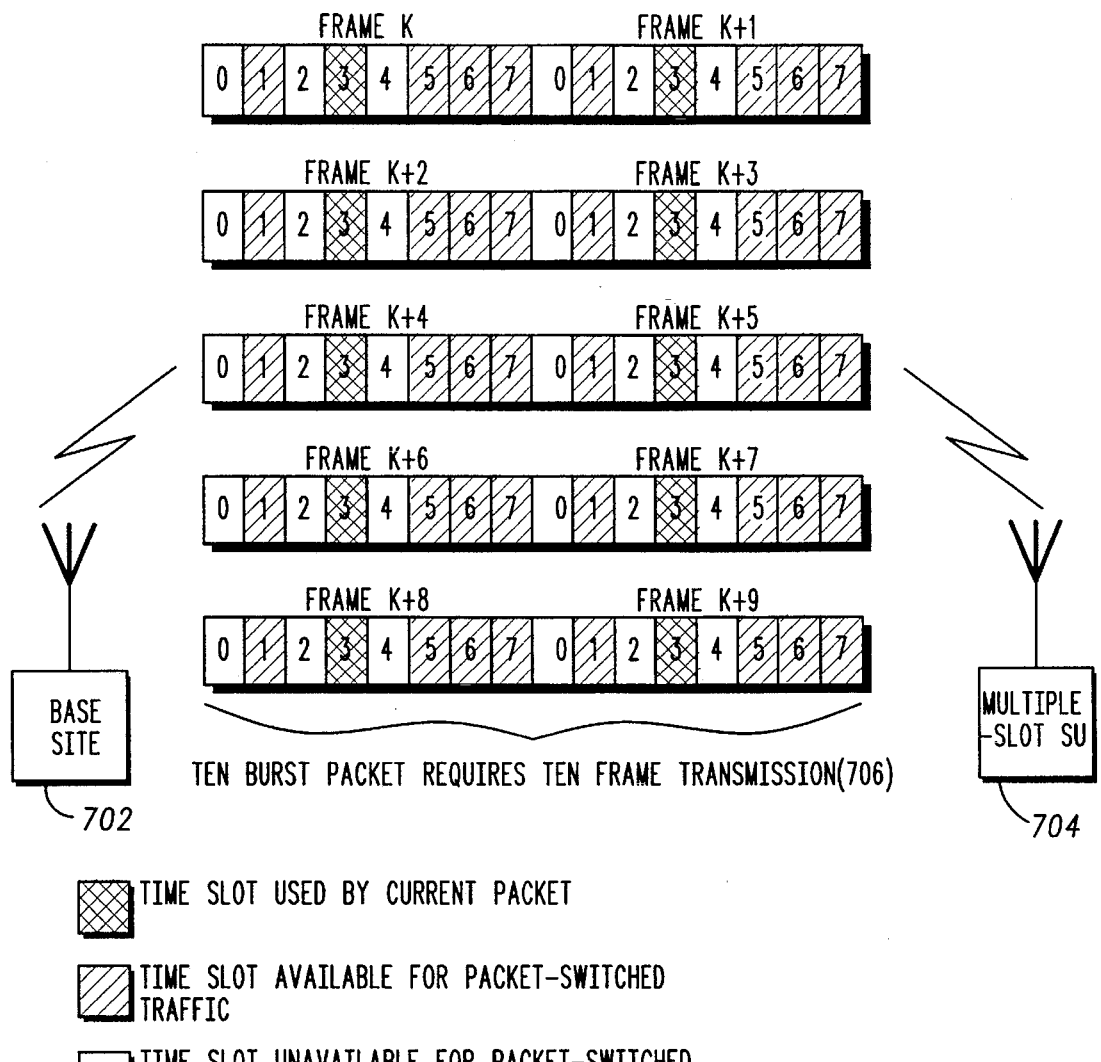
FIG. 7 is a diagrammatic representation of a transmission of a packet without the use of the present invention.
Figure 8:
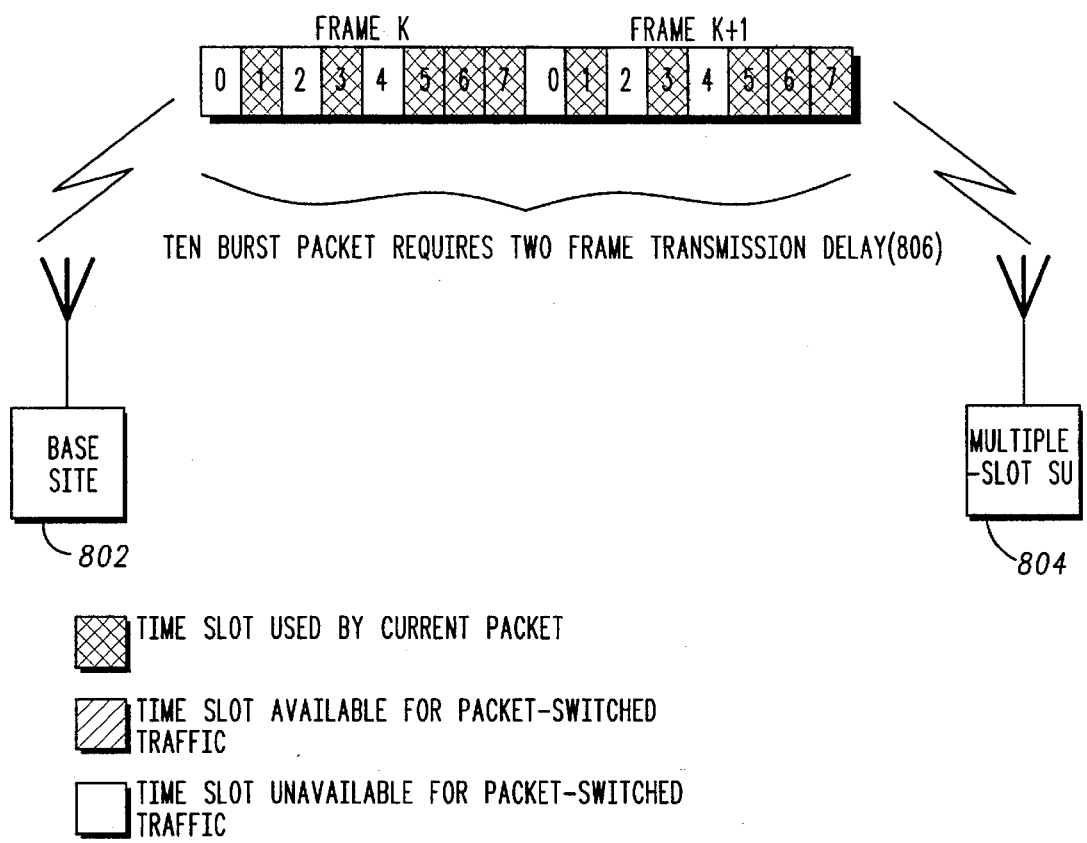
FIG. 8 is a diagrammatic representation of a transmission of a packet in accordance with the present invention.

In the example of FIG. 7, numeral 700, a diagrammatic representation of a transmission of a packet without the use of the present invention is shown. A packet of size k*10 bytes, k a positive integer, is sent on the downlink as a single fragment. If the base site (702) transmits k bytes of data per burst to a multiple slot subscriber unit (704), a transmission delay of 10 frames (706) is required to transmit the packet. If there is no other data to be sent on the downlink at this time, 4 of the 5 time slots available for packet-switched traffic are unused. In FIG. 8, numeral 800, a diagrammatic representation of a transmission of a packet using the present invention is shown. The same k*10 byte packet is divided into 5 fragments of size k*2 bytes before transmission by the base site (802) to the multiple slot subscriber unit (804). Since there are 5 time slots available for packet-switched traffic, the transmission delay (806) is reduced to 2 frames.

Figure 9:
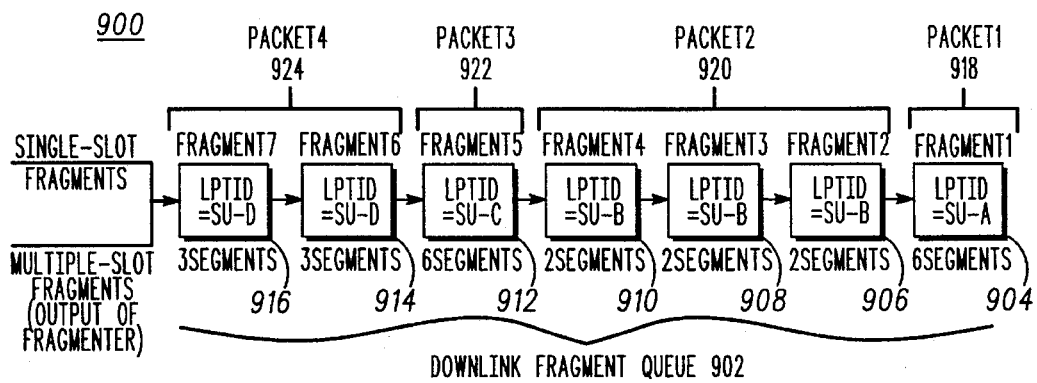
FIG. 9 is a diagrammatic representation of fragment transmission on a downlink channel to a plurality of subscriber units in accordance with the present invention.
Figure 9:
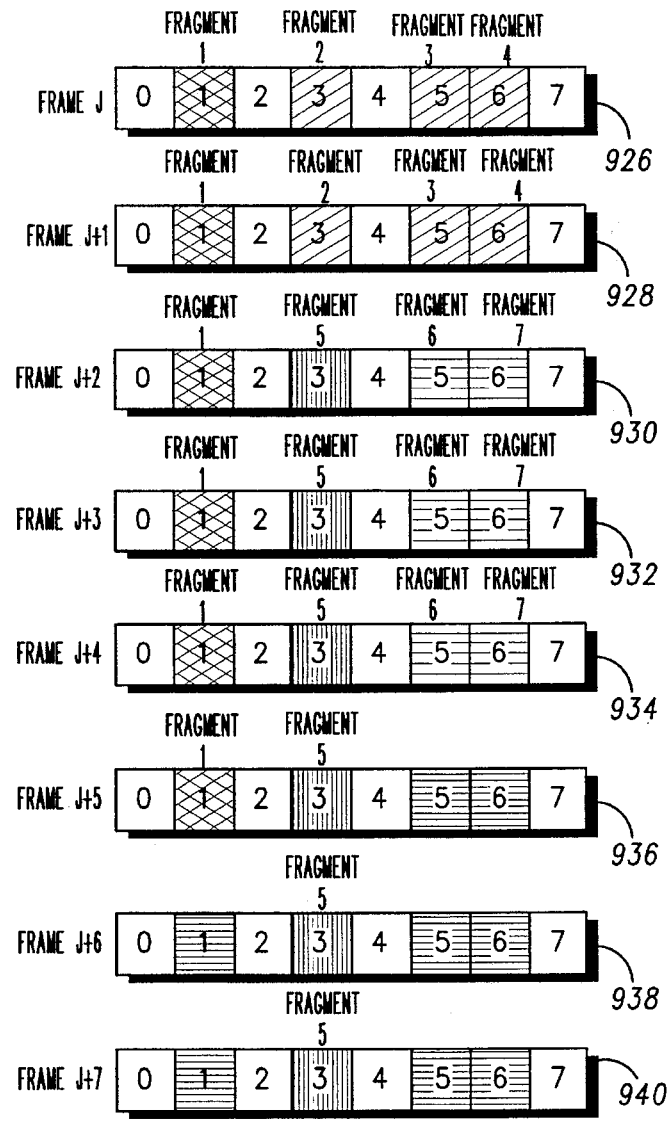

FIG. 9, numeral 900, is a diagrammatic representation of fragment transmission on a downlink channel to a plurality of subscriber units in accordance with the present invention. FIG. 9 illustrates the allocation of the downlink channel through the use of a simple scheduling algorithm. In this example, there are 7 fragments (904, 906, 908, 910, 912, 914, 916) in the Downlink Fragment Queue (902) at the beginning of Frame j. These 7 fragments belong to 4 6-segment packets (918, 920, 922, 924). All of these fragments are given equal priority by the time slot assignment unit, and the first 4 fragments (904, 906, 908, 910) are assigned to the 4 time slots available for packet-switched traffic in frame j (926). Fragment 1 (packet 1; 904) is transmitted in frames j through j+5 (926, 928, 930, 932, 934, 936). Fragments 2, 3, and 4 (i.e. packet 2; 906, 908, 910) are transmitted in frames j and j+1 (926, 928). Fragment 5 (922) is then transmitted in frames j+2 through j+7 (930, 932, 934, 936, 938, 940). Fragments 6 and 7 (packet 4; 914, 916) are transmitted in frames j+2 through j+4 (930, 932, 934). Thus packet delays of 6, 2, 8, and 5 frames for packets 1, 2, 3, and 4, respectively, are achieved in this case (average delay of 4.75 frames per packet). If these packets had been transmitted in one fragment each, all 4 packets would have been transmitted in frames j through j+5 (average delay of 6 frames per packet). Thus, the multiple slot hardware is utilized to significantly reduce the packet delays for these types of subscriber units, as well as the average packet delay of all 4 subscriber units. The cost is a minimal increase in delay for packet 3. Through the use of the present invention, the channel allocation of FIG. 9 is accomplished with a first-in, first-out queue; no additional complexity must be added to a time slot assignment unit used in the one-fragment packet case.

Figure 10:
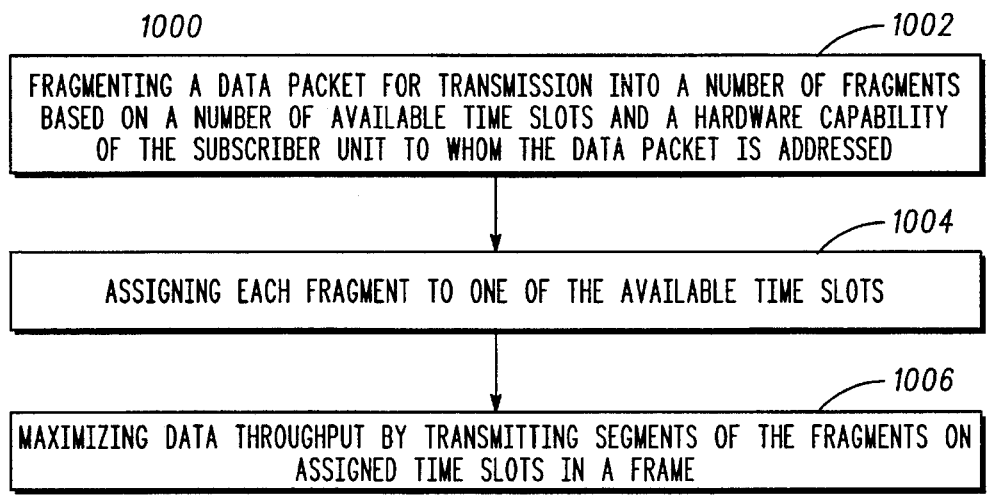
FIG. 10, numeral 1000, is a flow chart showing one embodiment of steps in accordance with the method of the present invention.

FIG. 10, numeral 1000, is a flow chart showing one embodiment of steps in accordance with the method of the present invention. The method includes the steps of: A) fragmenting a data packet for transmission into a number of fragments based on a number of available time slots and a hardware capability of the subscriber unit to which the packet is addressed (1002); B) assigning each fragment to one of the available time slots (1004); and C) maximizing data throughput by transmitting segments of the fragments on the assigned time slots in each frame (1006).

In a preferred embodiment of the present invention, the hardware capability in step A is the number of time slots on which a subscriber unit is capable of transmitting/receiving in a particular TDMA frame. At least one step of the method may be selected to be embodied in a tangible medium of/for a computer such as a computer diskette or a memory unit of the computer.

The present invention may be embodied in a device or a microprocessor of a base site for efficient transmission of a data packet by the base site, of available time slots of the base site, of a downstream channel in a TDMA packet communication system having at least one multiple time slot subscriber unit. The base site device/microprocessor includes a subscriber unit type determiner (604), a fragmenter (606), a time slot assignment unit (608) and radio frequency circuitry (506). The subscriber unit type determiner (604) is operably coupled to receive the data packet and a time slot status and is used for determining a type of subscriber unit as one of: single slot and multiple slot. The fragmenter (606) is operably coupled to the subscriber unit type determiner (604) and is used for fragmenting the data packet for a multiple slot type for transmission into a number of fragments based on the number of available time slots. The time slot assignment unit (608) is operably coupled to the fragmenter (606) and to the subscriber unit type determiner (604) and is used for assigning each fragment to one of the available time slots. The radio frequency circuitry (506) is operably coupled to the time slot assignment unit (608) and is used for maximizing data throughput by transmitting segments of the fragments on the assigned time slots in each frame. The fragmenter (606) may be selected to fragment the data packet based on the hardware capability of the subscriber unit for transmitting/receiving a plurality of time slots.

We claim:

1. A method for efficient utilization by a base site, of available time slots of the base site, of a downstream channel in a TDMA packet communication system having at least one multiple time slot subscriber unit, providing packet fragmentation for fair, efficient downlink transmission with low packet delay supporting both single slot subscriber units and multiple slot subscriber units which both use a same air-interface protocol, comprising the steps of:

A) fragmenting a data packet for transmission into a number of fragments based on a number of available time slots and a hardware capability of the at least one multiple time slot subscriber unit to which the data packet is addressed;

B) assigning each fragment to one of the available time slots; and

C) maximizing data throughput by transmitting segments of the fragments on assigned time slots in a frame.

2. The method of claim 1 wherein the hardware capability of the at least one multiple time slot subscriber unit is a number of time slots on which a subscriber unit is capable of transmitting/receiving in a particular TDMA frame.

3. The method of claim 1 wherein at least one step of the method is embodied in a tangible medium of/for a computer.

4. The method of claim 3 wherein the tangible medium is a computer diskette.

5. The method of claim 3 wherein the tangible medium is a memory unit of the computer.

6. A device/microprocessor of a base site for transmission of a data packet by the base site, of available time slots of the base site, of a downstream channel in a time division multiple access, TDMA, packet communication system having at least one multiple time slot subscriber unit, providing packet fragmentation for fair, efficient downlink transmission with low packet delay supporting both single slot subscriber units and multiple slot subscriber units which both use a same air-interface protocol, comprising:

A) a subscriber unit type determiner, operably coupled to receive the data packet and a time slot status, for determining a type of subscriber unit as one of: single slot and multiple slot;

B) a fragmenter, operably coupled to the subscriber unit type determiner, for fragmenting the data packet for a multiple slot type for transmission into a number of fragments based on the number of available time slots and a hardware capability of the subscriber unit to which the data packet is addressed;

C) time slot assignment unit, operably coupled to the fragmenter and to the subscriber unit type determiner, for assigning each fragment to one of the available time slots; and D) radio frequency circuitry, operably coupled to the time slot assignment unit, for maximizing data throughput by transmitting segments of the fragments on the assigned time slots in a frame.

7. The device/microprocessor of claim 6 wherein the hardware capability is the number of time slots on which a subscriber unit is capable of transmitting/receiving in a selected TDMA frame.

8. Computer software, embodied in a memory of a microprocessor, being a computer program for efficient utilization by a base site, of available time slots of the base site, of a downstream channel in a TDMA packet communication system having at least one multiple time slot subscriber unit, providing packet fragmentation for fair, efficient downlink transmission with low packet delay supporting both single slot subscriber units and multiple slot subscriber units which both use a same air-interface protocol, comprising the steps of:

A) fragmenting a data packet for transmission into a number of fragments based on a number of available time slots and a hardware capability of the subscriber unit to which the data packet is addressed;

B) assigning each fragment to one of the available time slots; and

C) maximizing data throughput by transmitting segments of the fragments on the assigned time slots in a frame.

9. The computer software of claim 8 wherein the hardware capability is the number of time slots on which a subscriber unit is capable of transmitting/receiving in a selected TDMA frame.

* * * * *